Sept. 24, 1940.　　E. G. DORGELO ET AL　　2,215,464
MOTION PICTURE APPARATUS
Filed Jan. 4, 1939　　2 Sheets-Sheet 1
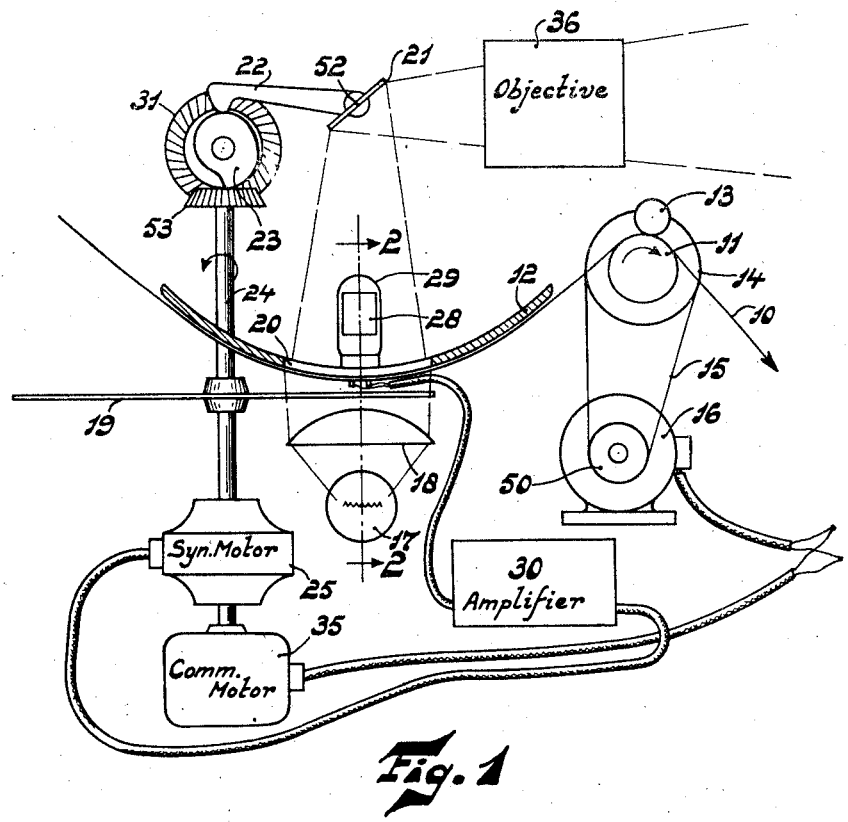
Fig. 1
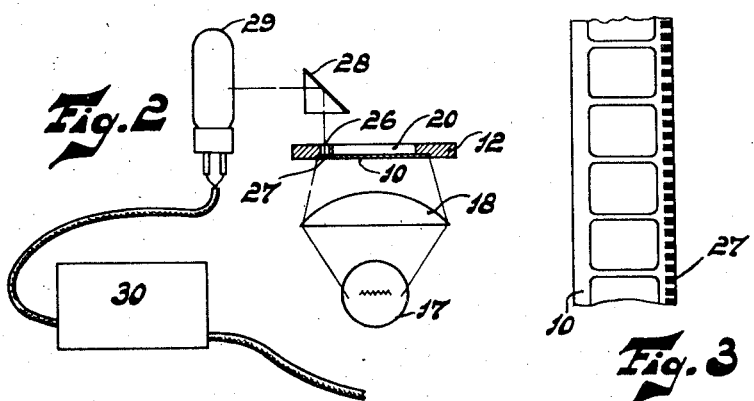
Fig. 2
Fig. 3
INVENTORS
E. G. Dorgelo and
P. M. van Alphen
BY E. F. Wenderoth
ATTORNEY

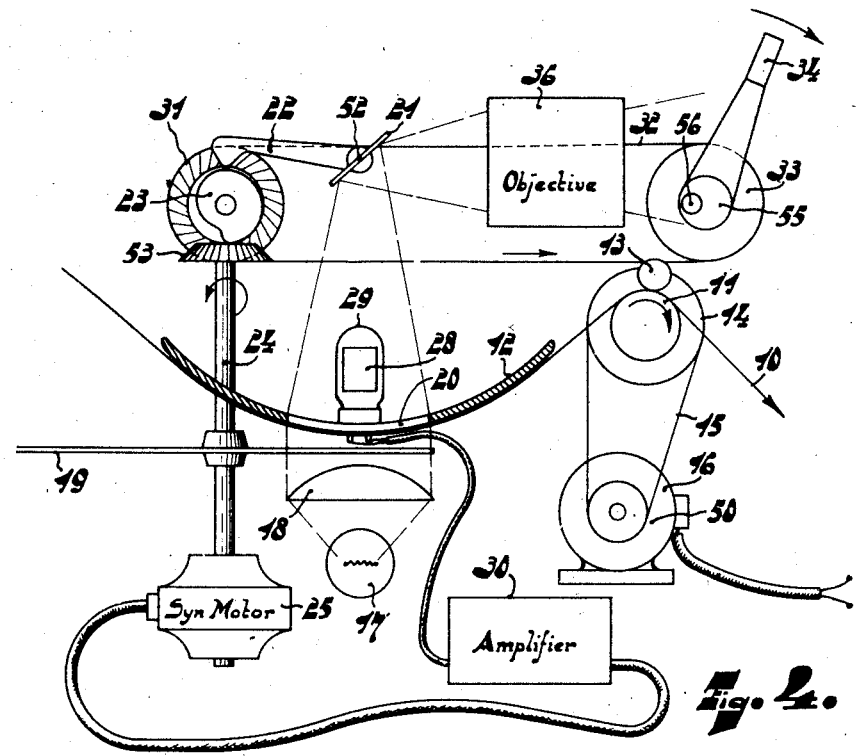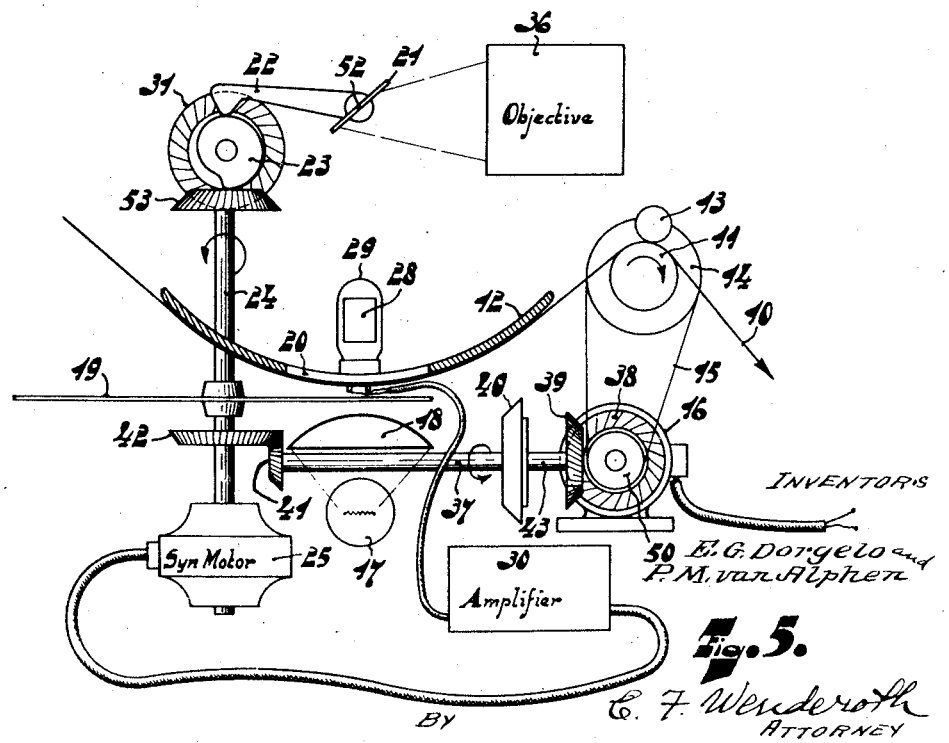

Patented Sept. 24, 1940

2,215,464

UNITED STATES PATENT OFFICE 2,215,464

MOTION PICTURE APPARATUS

Eduard Gerardus Dorgelo and Pieter Martinus van Alphen, Eindhoven, Netherlands, assignors, by mesne assignments, to Hartford National Bank and Trust Company, Hartford, Conn., as trustee Application January 4, 1939, Serial No. 249,334
In Germany January 8, 1938

6 Claims. (Cl. 88—16.8)

Our invention relates to apparatus for recording and reproducing films which have no perforations but are provided with optical control marks.

As is well known, these control marks are scanned by electro-optical means and the currents so obtained are amplified and supplied to a synchronous motor. This motor actuates a member which drives the mirror for the optical compensation and also the shutter when used, with the result that perfect synchronism is always obtained between the movement of the pictures and of the mirror, and when a shutter is provided, also between the movement of the pictures and the time during which the shutter is open. In addition to the above-mentioned synchronous motor, such an apparatus comprises a separate driving motor which drives the film.

The above type of apparatus is particularly suitable for projecting or recording with films of regenerated cellulose because such films are insufficiently rigid mechanically to permit their being carried forward by means of sprocket wheels and perforation holes.

We have found that when starting such an apparatus the frequency of the alternating current set up by the control marks gradually increases with the increasing film speed, and that at low frequencies, i. e. during starting, the amplifier, which supplies voltage to the synchronous motor, has only a very small output and is therefore incapable of supplying sufficient power to start this motor. On the other hand, when the speed of the film has reached approximately its normal value, the frequency is of too high a value to cause the synchronous motor to fall into step. As a result the synchronous motor frequently fails to start.

The object of the present invention is to overcome the above difficulties, and for this purpose we provide additional driving means which may be coupled with the above-mentioned synchronous motor, at least when the apparatus is being started.

As such auxiliary driving means we may use a separate driving motor of high starting torque, for example a commutator motor, and permanently couple this motor with the synchronous motor. However, to avoid the use of an additional motor we prefer to couple the synchronous motor with the film-driving motor either only during the starting or permanently. This coupling must be a slipping one as the speed of the synchronous motor depends upon the speed of the film and the ratio between the latter and the speed of the driving motor may be slightly different from that of said coupling.

In order that the invention may be clearly understood and readily carried into effect, we shall describe the same in more detail with reference to the accompanying drawings, in which:

Figure 1 is a diagrammatic view of a portion of a reproducing apparatus embodying the invention, Fig. 2 is a partly-sectionized view along line 2—2 of Figure 1, Fig. 3 is a plan view of the film of Figs. 1 and 2, and Fig. 4 is a diagrammatic view of a reproducing apparatus according to a second embodiment of the invention.

Fig. 5 shows diagrammatically a third embodiment of the invention.

The apparatus shown in Figures 1, 2 and 3 comprises a curved film guide 12 provided with a picture aperture 20 and a small control aperture 26 (see Fig. 2). A picture film 10 provided along one edge with opaque control marks 27 (see Fig. 3) is driven over the curved surface of guide 12 by a driving motor 16 of any suitable constant-speed type. For this purpose film 10 is pressed by a pressing roller 13 upon the smooth driving surface of a roller 11. Fixedly connected to roller 11 is a pulley 14 driven by a belt 15 from a pulley 50 mounted on the shaft of motor 16.

At one side of the film guide 12 is a suitable light source 17 and a condenser lens 18. The light passing through picture aperture 20 is reflected by a compensating mirror 21 through an objective 36 to thereby produce a stationary picture upon a screen (not shown). Mirror 21 is fixedly mounted upon a lever 22 adapted to be oscillated about an axis 52 perpendicular to the plane of the drawings. For this purpose lever 22 has a finger riding upon the edge of a cam 23 which is driven through bevel gears 31 and 53 from a shaft 24 by a synchronous motor 25. Fixedly mounted on shaft 24 is a shutter 19. As cam 23 and shutter 19 are directly driven by the common shaft 24 the movement of this shutter and mirror will always be in synchronism.

As shown more clearly in Fig. 2, part of the light leaving lens 18 passes through the control aperture 26. As the control marks 27 (in Fig. 3) extend the width of aperture 26, the light will be periodically interrupted by the movement of the film, and a periodically-interrupted light beam will be directed upon a prism 28 and then upon a photo-electric cell 29. These light impulses are transformed into substantially sinusoidal current variations, which after being amplified in an amplifier 30, are supplied to the synchronous motor 25 (see Fig. 1).

As has been stated above, at low frequencies, i. e. when the film 10 is traveling at a low speed, the output of amplifier 30 is insufficient to start motor 25. To overcome this difficulty we couple a separate motor 35 to shaft 24. Motor 35, which is of the variable speed type, for instance a commutator motor, and is connected to the same voltage supply (not shown) as motor 16, supplies the energy for driving shaft 24, whereas motor 25 serves only to maintain the shaft at the synchronous speed.

Instead of using a separate motor 35 an arrangement such as shown in Figure 4 may be used. In this figure, which is similar to Figure 1 and has the same parts indicated by the same reference numerals, the gear 31 is provided with a peripheral groove for a belt 32 which passes over a pulley 33 rotatably mounted on an eccentric 35 adapted to be rotated about a fixed shaft 36. A lever 34 is connected to eccentric 35 and by moving the same in the direction of the arrow the eccentric 35 can be rotated to thereby place belt 32 in contact with the surface of pulley 16. In this manner the shaft 24 can be driven from motor 16, and when the film has attained its normal speed, lever 34 can be returned to the position shown whereby the motor 25 will continue to run in synchronism with film 10.

Instead of using a separate motor to start or to support the torque of the synchronous motor 25 we may use a permanent coupling between the film driving motor 16 and the shaft 24 as shown in Fig. 5. In this figure, which is similar to Figure 1 and has the same parts indicated by the same reference numerals, the coupling shaft 37 is provided between the film driving motor 16 and the shaft 24 of the synchronous motor 25. A bevel gear 38 is mounted on the shaft of motor 16 and meshes with a bevel gear 39 secured to a shaft 43 connected to shaft 37 through a coupling 40 (later to be referred to). A bevel gear 41 secured to the end of shaft 37 engages a bevel gear 42 fixedly mounted on the shaft 24.

As the motor 16 drives the film 10 and the synchronous motor 25 and thus the shaft 24 is in perfect synchronism with the film, the coupling 40, shafts 37 and 43 form a second interconnection between the motors 16 and 25. When the ratio of transmission of the bevel gears 41, 42 and 38, 39 is not in perfect agreement with the ratio of the speeds of the motor 16 and the film 10, the motor 25 will be thrown out of synchronism. In such a case perfect working of the reproducing apparatus would be impossible. To overcome this the ratio of transmission between the motor 16 and the shaft 24 is made variable by means of the slipping coupling 40 between the shafts 37 and 43. The gears 39 and 38 are dimensioned in such a way that the shaft 43 will slightly overrun the shaft 37 at normal speed of the shaft 24. Although the motor 16 supports the rotation of the synchronous motor some difference in speed is allowed.

While we have described our invention with reference to specific examples and applications, we do not wish to be limited thereto but desire the appended claims to be construed as broadly as is permissible in view of the prior art.

What we claim is:

1. In a motion picture apparatus using non-perforated films provided with optical control marks, means for continuously driving the film past a picture gate including a driving motor, optical compensation means including a mirror, means separate from said driving motor for moving said mirror in synchronism with the movement of the control marks, said latter means including a rotary synchronous motor, and a fixed coupling between said latter motor and said optical compensation means, and means to supply additional power to said synchronous motor during the starting of the apparatus.

2. In a motion picture apparatus using non-perforated film provided with optical control marks, means for continuously driving the film past a picture gate including a driving motor, optical compensation means including a mirror, means separate from said driving motor for moving said mirror in synchronism with the movement of the control marks, said latter means including a rotary synchronous motor, and a fixed coupling between said latter motor and said optical compensation means, and a motor coupled to said synchronous motor to supply additional power thereto during the starting of the apparatus.

3. In a motion picture apparatus using non-perforated films provided with optical control marks, means for continuously driving the film past a picture gate including a driving motor, optical compensation means including a mirror, means separate from said driving motor for moving said mirror in synchronism with the movement of the control marks, said latter means including a rotary synchronous motor, and a fixed coupling between said latter motor and said optical compensation means, and means to supply additional power to said synchronous motor during the starting of the apparatus, said last means including said driving motor.

4. In a motion picture apparatus using non-perforated films provided with optical control marks, means for continuously driving the film including a driving motor, optical compensation means including a mirror, a shutter, means for moving said mirror and shutter in synchronism with the movement of the control marks including a synchronous motor, and means to supply additional driving power to said mirror during the starting of the apparatus.

5. In a motion picture apparatus using non-perforated films provided with optical control marks, means for continuously driving the film including a driving motor, a compensating mirror, means for moving said mirror in synchronism with the movement of the control marks including a shaft and a synchronous motor connected to said shaft, a shutter mounted on said shaft, and means to connect said shaft to said driving motor during the starting of the apparatus.

6. In a motion picture apparatus using non-perforated films provided with optical control marks, means for continuously driving the film including a driving motor, optical compensating means including a mirror, means for moving said mirror in synchronism with the movement of the control marks including a synchronous motor and a shaft coupled thereto, means for coupling said driving motor permanently to said synchronous motor including a slipping coupling.

EDUARD GERARDUS DORGELO.
PIETER MARTINUS van ALPHEN.